Patented Jan. 16, 1923.

1,442,330

UNITED STATES PATENT OFFICE.

NORMAN A. DUBOIS, OF NEEDHAM, MASSACHUSETTS.

COOLING AND REFRIGERATING SOLUTION.

No Drawing. Application filed July 24, 1920. Serial No. 398,716.

*To all whom it may concern:*

Be it known that I, NORMAN A. DUBOIS, a citizen of the United States, residing at Needham, in the county of Norfolk and State of Massachusetts, have invented certain new and useful Improvements in Cooling and Refrigerating Solutions; and I do hereby declare the following to be a full, clear, and exact description of the invention, such as will enable others skilled in the art to which it appertains to make and use the same.

The present invention relates to non-corrosive solutions and methods of making the same.

It will be obvious to those skilled in the art that it is desirable to provide some form of liquid medium which may be employed in heating and refrigerating systems and in motor cooling systems without corroding the metal containers or pipes forming a part of the system.

I have discovered that the objectionable corrosive action of liquid mediums employed for this purpose may be substantially or entirely eliminated by the addition to these solutions of a relatively small quantity of a chromate such as zinc chromate for example.

Although, as stated, the present discovery is applicable to liquid mediums such as aqueous solutions of salts employed for various purposes, the principal and perhaps the most important use of the invention is in connection with calcium chloride solutions employed as cooling mediums for motor vehicle radiators, and as brine solutions in refrigerating systems. Calcium chloride solutions are particularly adapted for use as cooling mediums for motor vehicle radiators, and also for refrigerating work for the reason that such solutions have freezing points much below that of water. Furthermore, the solubility of calcium chloride in water, even at extremely low temperatures, is such as to preclude the crystallization of the solid calcium chloride from the solution. One objectionable feature of these solutions, however, resides in their corrosive action upon the metal of the motor vehicle radiator, or the pipes of the refrigerating systems. In the design of refrigerating systems the cast-iron pipes are ordinarily made of sufficient thickness to permit them to withstand the extreme corrosive action of the calcium chloride solutions for long periods of time. It is a fact, however, that the metal is gradually eaten away so that sooner or later the pipes must be replaced. The use of calcium chloride in anti-freezing solutions for motor vehicle radiators has not been extensive for the reason that the corrosive action of the solution soon eats through the relatively thin tubing of the radiator, developing leaks and interfering with the successful cooling of the motor.

The following will illustrate a specific example of my new product and its manufacture. In the preparation of a non-corrosive solution for use as an anti-freezing mixture for motor vehicle radiators, a solution of calcium chloride is prepared by dissolving 36 parts or less of solid calcium chloride in 100 parts of water. To this solution a difficultly soluble chromate such as zinc chromate is added in amount approximately 1/10 of 1 per cent. of the weight of the solution. The quantity of chromate added may properly be termed "a trace" as it will not exceed one per cent by weight of solution. The zinc chromate imparts a yellowish cast to the solution, but otherwise does not affect the clarity thereof. The exact concentration of the calcium chloride in the solution will obviously depend upon the nature of the use which it is desired to make of the solution.

The action of the chromate is not exactly understood, but repeated experiment has shown that the presence of a minute quantity of zinc chromate renders calcium chloride and similar solutions inert, so that no corrosive or electrolytic action occurs between metals and the solution even when the metal is in contact with the solution for a long period of time.

The corrosive action of calcium chloride solutions is not confined to the rusting of iron, but it is well known that such solutions readily cause the disintegration of other metals such as copper or zinc. The corrosive action in such cases is due to the formation of an electrolytic couple, in which calcium chloride solution is the electrolyte, and in which the copper or zinc constitutes the electrodes. Such electrolytic action is entirely eliminated by the presence of the zinc chromate.

Viewed in its broader aspects, the invention contemplates the production of an aqueous solution, having a freezing point lower than that of water, and containing a small quantity of a difficultly soluble chromate. It is obvious that solutions of the latter type may be produced by the addition of a variety of salts, glycerin and alcohol, all of which serve to lower the freezing point or increase the boiling point of the solution. By "difficultly soluble" is meant a solubility in water of the order of that of zinc chromate.

Having thus described the invention, what is claimed is:

1. A non-corroding, anti-freeze mixture comprising an aqueous solution of a freezing temperature depressant, and a difficultly soluble chromate.

2. A non-corroding, anti-freeze mixture comprising an aqueous solution of a chloride and a difficultly soluble chromate.

3. A non-corroding, anti-freeze mixture comprising an aqueous solution of a freezing temperature depressant and zinc chromate.

4. A non-corroding, anti-freeze mixture comprising an aqueous solution of a chloride and zinc chromate.

NORMAN A. DUBOIS.